Nov. 11, 1924.

F. P. MARTIN 1,515,353

ELECTRICALLY CONTROLLED VALVE

Filed March 16, 1923

Inventor
FERMAN P. MARTIN
By his Attorneys
Newell & Spencer

Patented Nov. 11, 1924.

1,515,353

UNITED STATES PATENT OFFICE.

FERMAN P. MARTIN, OF DETROIT, MICHIGAN, ASSIGNOR TO DODGE BROTHERS, OF DETROIT, MICHIGAN, A CORPORATION OF MICHIGAN.

ELECTRICALLY-CONTROLLED VALVE.

Application filed March 16, 1923. Serial No. 625,681.

*To all whom it may concern:*

Be it known that I, FERMAN P. MARTIN, a citizen of the United States, residing at Detroit, Mich., have invented a certain new and useful Improvement in Electrically-Controlled Valves, of which the following is a clear, full, and exact description.

This invention relates to valve operating devices, and more particularly to those in which a solenoid is employed as the motive power to lift a valve off its seat and to maintain it in open position.

The invention has a wide range of usefulness, especially as applied to valves which are normally seated under pressure. Such valves may control the supply of oil, gas, steam, hot air or other gaseous or liquid substances.

In the drawings—

Figure 1:
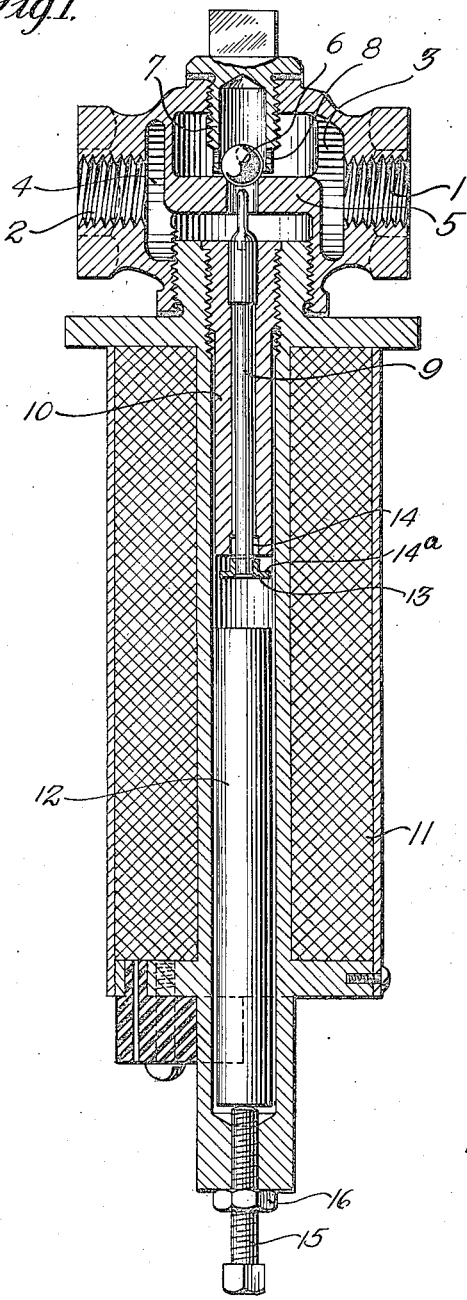
Figure 1 is a sectional view of my improved valve operating mechanism, the section being taken on the line 2—2 of Fig. 2.
Figure 2:
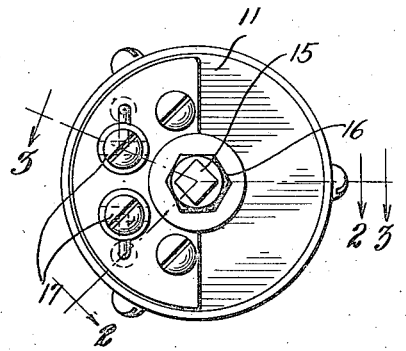
Fig. 2 is a view looking upwardly from below.
Figure 3:
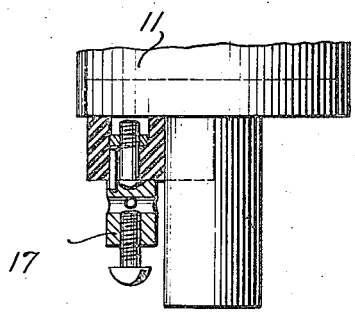
Fig. 3 is a part sectional, part elevational view taken on the line 3—3 of Fig. 2.

Referring to the drawing, the substance whose flow is to be controlled, is supplied by a pipe which is threaded into an opening 1, thereby passing to a chamber 3, which is separated from a chamber 4 by a partition 5 having an opening therethrough and serving as a seat for a ball valve 6. The substance to be dealt with may be conveyed from the chamber 4, to any desired locality, said chamber being threaded at 2 for this purpose. The ball valve 6 is guided in a screw-threaded sleeve 7 having small openings 8 at its lower portion. For the purpose of illustrating a practical embodiment of my invention, it may be assumed that the valve 6 is to control the supply of oil to a burner. Ordinarily a by-pass would be provided, allowing enough oil to flow to keep the temperature of the furnace at at least a certain minimum. When the temperature in the furnace drops below this minimum, however, means are provided whereby an electric circuit is closed and the valve 6 lifted and maintained off its seat to permit a larger quantity of oil to flow to the burner than would ordinarily be permitted by the by-pass. As soon as the temperature gets too high the electric circuit is broken and the valve immediately reseats under pressure of the oil, which is maintained at from 40 to 60 pounds to the square inch. With this pressure it has been found that an electromagnet, or solenoid of ordinary construction, is not adequate to properly lift the valve from its seat and maintain it in lifted position. In such constructions, even if the valve is lifted it is not maintained in lifted position.

I have provided, therefore, a solenoid of special construction which is admirably adapted to the duty required of it. In my preferred construction, a plunger 9 passes loosely through a sleeve or plug 10, which sleeve projects into the upper portion of a solenoid 11, said solenoid being provided with a core or armature 12. The plunger 9 is preferably made of non-magnetic material and carries a head 13 also of non-magnetic material. The end of the plunger opposite the head is directly under the ball 6 which it is adapted to engage and move to a position permitting free flow of oil. The head of the plunger is cut away so that it may enter an aperture 14 in the sleeve 10, the head being provided with shoulders 14ª for limiting the upward movement of the plunger.

Preferably the sleeve or plug 10 is of magnetic material so that the armature of the solenoid is held in its actuated position not only by the magnetic field induced by the solenoid, but by the augmented magnetic force produced by the plug 10 as well. Preferably, too, the plug is made of soft iron, so that it may quickly lose its magnetism when the current in the solenoid ceases to flow.

Since the valve 6 is under considerable pressure, it requires considerable force to lift it. To do this effectively the armature is normally spaced from the head of the plunger, so as to act percussively on the plunger when the solenoid is energized. Furthermore, it will be noticed that normally the center of gravity of the armature is below what might be termed the magnetic center of the solenoid. When the solenoid is energized, therefore, the armature or core strikes the plunger and lifts the valve off its seat but the solenoid still tends to move it further in an upward direction. The plug 10, when made of magnetic material, increases this tendency thereby maintaining the valve open as long as the solenoid remains energized. In order to adjust the amount of free movement of the armature before it strikes the head of the plunger, a set screw 15 is provided, a suitable lock nut 16 serving to hold the screw in its various positions of adjustment. Suitable binding posts 17 serve as means whereby the solenoid is connected electrically to any suitable device for controlling it. In the particular embodiment of the invention shown, it is intended that the electrical control shall be by means of some sort of a heat responsive device such as a pyrometer suitably located in the furnace whose temperature is to be controlled.

Of course when the circuit through the solenoid is open, the armature drops of its own weight to the position shown in Fig. 1. This is readily permitted by reason of the fact that the head 13 of the plunger is of non-magnetic material and is interposed between the armature and the sleeve or plug 10, thus forming an air gap so that any residual magnetism remaining in the sleeve 10 will not cause sticking of the armature. In order to prevent any dash pot effect as the ball 6 is lifted off its seat, the small openings 8 at the lower portion of the sleeve 7 provide for the free flow of oil into and out of the chamber wherein the ball moves.

It will be understood that variations may be resorted to within the scope of the invention without departing from the spirit thereof.

I claim:

In a device of the character described, the combination with a valve and a valve seat, of a solenoid, an armature therefor, a plunger between the armature and valve, said plunger having a head of non-magnetic material, a plug of magnetic material through which the plunger passes, the end of the armature being normally spaced from the head of the plunger so that when the solenoid is energized the plunger is struck by the armature to unseat the valve, the magnetic plug then acting to hold the armature in actuated position to thereby maintain the valve open.

Signed at Detroit, Michigan, this 12th day of March, 1923.

FERMAN P. MARTIN.